No. 693,927. Patented Feb. 25, 1902.
C. F. TUCKER.
OIL HOLE COVER AND CUP.
(Application filed Jan. 4, 1901.)
(No Model.)

Witnesses:
Wm. H. Barker.
Arthur B Jenkins

Inventor:
Charles F. Tucker.
by Chas. L. Burdett,
Attorney.

THE NORRIS PETERS CO., PHOTO-LITHO., WASHINGTON, D. C.

UNITED STATES PATENT OFFICE.

CHARLES F. TUCKER, OF HARTFORD, CONNECTICUT.

OIL-HOLE COVER OR CUP.

SPECIFICATION forming part of Letters Patent No. 693,927, dated February 25, 1902.

Application filed January 4, 1901. Serial No. 42,067. (No model.)

*To all whom it may concern:*

Be it known that I, CHARLES F. TUCKER, a citizen of the United States, and a resident of Hartford, in the county of Hartford and State of Connecticut, have invented certain new and useful Improvements in Oil Cups or Covers, of which the following is a specification.

My invention relates to the class of devices used on various machinery which has moving parts and openings in some of said parts for the introduction of a lubricant, such openings usually being provided with an oil cup or cover to hold a supply of oil or to simply cover the opening in such manner as to prevent any leakage of oil.

The object of my invention is to provide an oil cup or cover of this class in which the oil-port shall be adjustable for the introduction of oil from any side of the structure with reference to its central axis, thus providing for a secure attachment of the oil cup or cover to the machine by permitting the attaching part to be driven home and yet leaving the oil-port accessible.

Figure 2:
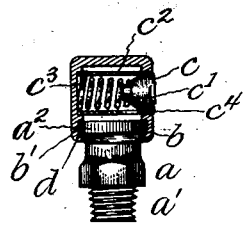
Figure 1:
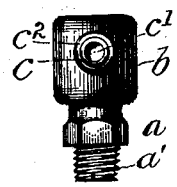
Figure 5:
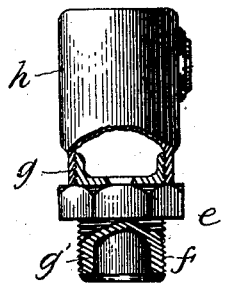
Figure 3:
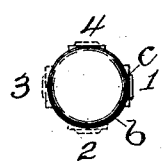
Figure 6:
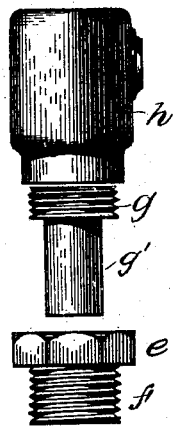
Figure 4:
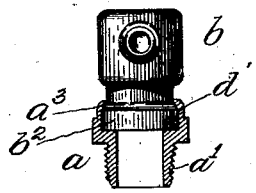

Referring to the drawings forming a part hereof, Figure 1 is a view in elevation of one form of my invention. Fig. 2 is a view in central section of the head of the structure and in side view of the body part. Fig. 3 is a top or plan view of the structure, illustrating the rotary feature of the device. Fig. 4 is a view of a modified form of attachment between the body part and head. Fig. 5 is a view on enlarged scale showing a modified form of the invention and with parts cut away to show construction. Fig. 6 is a view of the same device and with the parts separated.

In the accompanying drawings the letter $a$ denotes the base member of an oil cover or cup, and $b$ the outer member, in which an opening is provided for the insertion of oil or other lubricant. These two members are so united as to enable the outer member to turn on the base member in such manner as to enable the oil-hole in the outer member to be located in any desired direction with reference to the axis of the device. The base member is threaded to enable the structure to be fastened in a threaded hole in the machine or part to which the oil-cup is to be attached, and the outer member is connected to the base member by an interengaging part, the joint being close enough to prevent the leakage of oil and to hold the parts in a definite relative position, except when sufficient force is applied to overcome the frictional resistance to motion of the parts of the joint which are in contact.

My idea may be embodied in various forms, with two parts, as shown in Figs. 1, 2, and 4, in three parts, as shown in the modified form in Figs. 5 and 6, and in other forms clearly within the skill of the artisan to whom my invention may be disclosed. As shown in Figs. 1 and 2, the base member $a$ has a threaded shank $a'$ as a means for attaching it in a hole with a threaded wall, and a flange $a^2$, upon which the lower edge $b'$ of the outer member $b$ is turned, so as to form a friction-joint $d$. In the form shown in Fig. 4 the flange and the lip are reversed, the latter being on the base-piece and the flange on the outer member; but the same joint $d'$ is formed as in the other instance. The purpose of the frictional joint between the members of the oil cup or cover is to enable the outer member to be set so that the oil-hole $c$ may be placed as at 1 in Fig. 3, as at 2, 3, or 4, or in any intermediate position. This enables the device to be applied to a machine and fastened wherever the threads locate it and yet permit the adjustment of the outer member so that the oil-hole is accessible.

A modified form of my invention is shown in Figs. 5 and 6, in which the base-piece $e$ is formed as to its body part so that a wrench may be used to screw the threaded stem $f$ into the threaded hole in the machine on which the cup or cover is to be used, a smooth opening through the center of the base-piece forming a bearing for the shank $g'$ of the sleeve $g$, the lower end of which is turned over the end of the stem $f$ and the upper end having a shoulder which overhangs the upper surface of the base-piece, thus forming a frictional joint between the parts. The outer member $h$ is secured to the enlarged end of the sleeve $g$, as by means of interengaging threaded parts.

The oil-hole $c$ is closed by my improved valve $c'$, which is spherical in outline as to the bearing-surface in contact with the valve-seat formed on the inturned outer end of the tube $c^2$, in which the valve is located, a spiral spring $c^3$ in the tube holding the valve to its seat with a yielding pressure. The tube $c^2$ is located across the chamber in the outer member and has a port $c^4$ through its wall just back of the valve-seat to permit the end of an oil-can to be inserted for the purpose of introducing a supply of oil. The projecting surface of the valve $c'$ has a recess to aid in forcing the valve inward, a projecting stem on the back of the valve being fast to the spring to hold the valve normally in the position shown in Fig. 1 as to its axis.

It is of course to be understood that in each instance the oil cup or cover has an opening through the base or inner member for the passage of the lubricant.

What I claim as my invention, and desire to secure by Letters Patent, is—

1. In combination in an oil cup or cover, a base member with means for attachment in an oil-hole, an attached member having an oil-chamber, an opening through its side wall and a valve therein, and a connection between said members permitting rotary movement only of one of said members.

2. In combination in an oil cup or cover, a base-piece with means for attachment to a structure, an outer member having an oil-chamber, an opening through its side wall and a valve therein, and a flange on the one member inclosed by the inturned edge of the other member and permitting rotary movement only of one of said members.

3. In combination in an oil cup or cover, a base member with means for attachment in an oil-hole, an attached member having an oil-chamber and an opening through its wall, a connection between said members permitting rotary movement only of one of said members, and a tube extending transversely of said oil-chamber with an oil-port through its wall.

CHARLES F. TUCKER.

Witnesses:
CHAS. L. BURDETT,
W. W. TUCKER.